(12) United States Patent
Flores et al.

(10) Patent No.: US 8,641,860 B2
(45) Date of Patent: Feb. 4, 2014

(54) ADHESIVE HEIGHT SETTING

(75) Inventors: Paco Flores, Felton, CA (US); Anthony J. Aiello, Santa Cruz, CA (US); Klaus D. Kloeppel, Watsonville, CA (US); Reid E. Berry, Ben Lomond, CA (US)

(73) Assignee: Seagate Technology LLC, Cupertino, CA (US)

( * ) Notice: Subject to any disclaimer, the term of this patent is extended or adjusted under 35 U.S.C. 154(b) by 359 days.

(21) Appl. No.: 12/367,188

(22) Filed: Feb. 6, 2009

(65) Prior Publication Data
US 2009/0139638 A1 Jun. 4, 2009

Related U.S. Application Data

(62) Division of application No. 11/054,149, filed on Feb. 8, 2005, now Pat. No. 7,495,862.

(51) Int. Cl.
| | |
|---|---|
| *B29C 65/00* | (2006.01) |
| *B32B 37/00* | (2006.01) |
| *F16C 32/06* | (2006.01) |
| *H02K 5/16* | (2006.01) |
| *H02K 7/08* | (2006.01) |
| *G11B 17/02* | (2006.01) |
| *B21K 1/10* | (2006.01) |

(52) U.S. Cl.
USPC ............. 156/292; 384/121; 384/123; 310/90; 360/99.09; 29/898.041

(58) Field of Classification Search
USPC ........... 156/60, 196, 210, 219, 242, 245, 292, 156/295; 384/91, 100, 107, 108, 112, 113, 384/114, 121, 123; 310/10, 40 R, 46, 66, 310/90; 360/88, 97.01, 99.08, 99.09, 99.11; 29/596, 598, 898, 898.02, 898.04, 29/898.041, 898.042, 898.07, 898.09, 29/898.12, 898.13

See application file for complete search history.

(56) References Cited

U.S. PATENT DOCUMENTS

| | | | |
|---|---|---|---|
| 3,668,658 A | 6/1972 | Flores et al. | |
| 3,903,644 A * | 9/1975 | Swift et al. | 47/79 |
| 4,040,207 A * | 8/1977 | Lancaster | 47/80 |
| 4,647,948 A | 3/1987 | Odawara | |
| 4,893,297 A | 1/1990 | Gregg | |
| 5,147,208 A | 9/1992 | Bachler | |
| 5,273,598 A | 12/1993 | Higasihara et al. | |
| 5,281,886 A * | 1/1994 | Ohta | 310/90 |
| 5,855,063 A | 1/1999 | Schreiber et al. | |

(Continued)

FOREIGN PATENT DOCUMENTS

| | | | | |
|---|---|---|---|---|
| JP | 57138064 A | | 8/1982 | |
| JP | 05154064 A | * | 6/1993 | A47K 3/16 |

*Primary Examiner* — Philip Tucker
*Assistant Examiner* — Brian R Slawski

(57) ABSTRACT

Methods for adhering parts together using part gap spacers are provided herein. Part gap spacers are formed in a selected pattern and a selected height on a surface of at least one surface of two parts to be oppositely disposed. When disposed opposite each other, at least some of the part gap spacers contact the opposite surface, and establish a standoff distance that is generally uniform, and thereby creating voids. Adhesive is disposed in at least some of the voids to adhere the part surfaces to each other. Further methods comprise forming part gap spacers on multiple sides of a third part to be disposed intermediate two surfaces. The part gap spacers can be formed in a variety of shapes, including bumps, tapers, ribs, and flange edges.

8 Claims, 5 Drawing Sheets

(56) References Cited

U.S. PATENT DOCUMENTS

| | | | |
|---|---|---|---|
| 6,118,620 A | 9/2000 | Grantz et al. | |
| 6,157,515 A | 12/2000 | Boutaghou | |
| 6,417,997 B1* | 7/2002 | Williams | 360/245.8 |
| 6,597,539 B1* | 7/2003 | Stupp et al. | 360/245.7 |
| 6,683,756 B1 | 1/2004 | Zhao et al. | |
| 6,690,541 B2 | 2/2004 | Kazmierczak | |
| 6,778,353 B1 | 8/2004 | Harper | |
| 6,876,509 B2 | 4/2005 | Bonin et al. | |
| 7,196,869 B2 | 3/2007 | Feliss et al. | |
| 2003/0053260 A1 | 3/2003 | Barina et al. | |
| 2003/0141782 A1* | 7/2003 | Bader et al. | 310/313 R |
| 2003/0223216 A1 | 12/2003 | Emmons et al. | |
| 2004/0090702 A1 | 5/2004 | Aiello et al. | |
| 2004/0156145 A1 | 8/2004 | Koishi | |
| 2005/0270698 A1* | 12/2005 | Oh et al. | 360/245.1 |

* cited by examiner

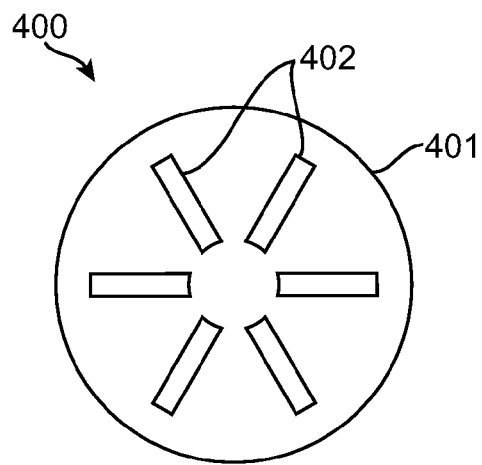
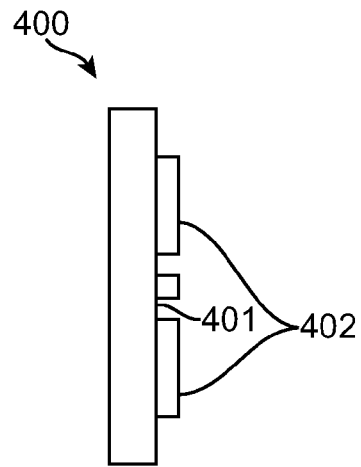
FIG. 5A   FIG. 5B
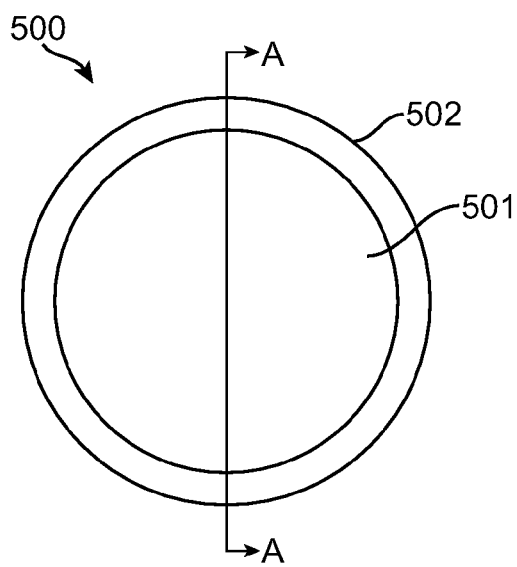
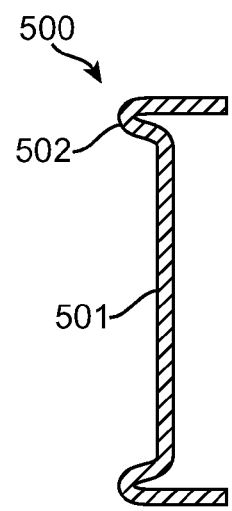
FIG. 6A   FIG. 6B

ADHESIVE HEIGHT SETTING

RELATED APPLICATION

This divisional application claims priority from U.S. application Ser. No. 11/054,149, filed Feb. 8, 2005, now U.S. Pat. No. 7,495,862, and which is herein fully incorporated by reference as if fully set forth and for all purposes.

BACKGROUND

1. Field of the Application

The present application is directed to devices for spacing parts in a hard disk drive assembly or a fluid dynamic bearing (FDB) motor.

2. Related Art

In the assembly of a fluid dynamic bearing motor, it is often desirable to use adhesives to bond or connect parts of the motor. However, there are significant obstacles to using adhesives in a precision assembly that bonds or connects parts. It is desirable to control bond line thickness for optimum bond strength. In addition, part tolerance accumulation is larger when adhesives are used to connect the surfaces of two parts. In many applications, it is desirable for parts to be fixed at substantially uniform distances during adhesive hardening. In other applications, it is desirable for a bearing fluid to be disposed between adjacent parts. In other applications, it is desirable for electric conductivity between parts to be controlled or restricted.

SUMMARY

In one aspect, the present application is directed to a device for spacing parts in a hard disk drive assembly or FDB motor. The device includes two adjacent parts of a fluid dynamic bearing motor having facing surfaces. A plurality of gap spacers is disposed on one or more of the facing surfaces of the two adjacent parts. The gap spacers provide a substantially uniform distance between the two adjacent parts.

In one variation, each gap spacer is selected from the group consisting of a bump, a radial rib, a flange edge, and a taper. In another variation, the gap spacers are disposed on each facing surface of the adjacent parts.

In another aspect, adhesive or bearing fluid is disposed between the two adjacent parts. In one variation, the adhesive can be an anaerobic adhesive. In another variation, the adhesive can be epoxy.

In another aspect, the present application is directed to a device for spacing parts in a hard disk drive assembly or FDB motor. First and second parts each have facing surfaces. An intermediate part having first and second oppositely oriented surfaces is interposed between the facing surfaces of the first and second parts. A plurality of gap spacers is disposed on at least one of the first surface of the intermediate part and the facing surface of the first part such that the first part is spaced a substantially uniform distance from the intermediate part. A plurality of gap spacers is disposed on at least one of the second surface of the intermediate part and the facing surface second part such that the second part is spaced a substantially uniform distance from the intermediate part.

In one variation, an adhesive is disposed between the first surface of the intermediate part and the facing surface of the first part. In a further variation, the adhesive is also disposed between the second surface of the intermediate part and the facing surface of the second part. In a further variation, the adhesive is an anaerobic adhesive. In another variation, the adhesive is epoxy.

In another variation, a bearing fluid is disposed between the first surface of the intermediate part and the facing surface of the first part. In another variation, bearing fluid is disposed between the second surface of the intermediate part and the facing surface of the second part. Alternatively, an adhesive is disposed between a second surface of the intermediate part and the facing surface of the second part.

In a further variation, part gap spacers are electrically conductive, and provide for an electrical connection between adjacent parts.

BRIEF DESCRIPTION OF THE DRAWINGS

FIG. 5A depicts the top view of a part having radially aligned ribs;

FIG. 5B depicts a side view of the part of FIG. 5A;

FIG. 6A depicts the top view of a flange;

FIG. 6B depicts a cross-sectional side view of the flange of FIG. 6A;

DETAILED DESCRIPTION

The present application is directed to part gap spacers disposed between parts in a fluid dynamic bearing motor. Part gap spacers are designed to off-set adjacent parts such that part-to-part spacing has less variation due to tolerance accumulation. Part gap spacers also allow for greater control of bond line thickness of adhesives. When an adhesive is disposed between the two parts, the parts are maintained at a substantially uniform distance during hardening. Part gap spacers reduce or eliminate the need for fixturing while adhesive hardens or cures. Part gap spacers can be configured to provide a substantially uniform stand-off distance between parts in applications where a fluid, such as a bearing fluid, flows between the parts. Further, part gap spacers can also control part-to-part conductivity. In certain embodiments, part gap spacers are used to attach a high precision part to a low precision part.

Figure 1:
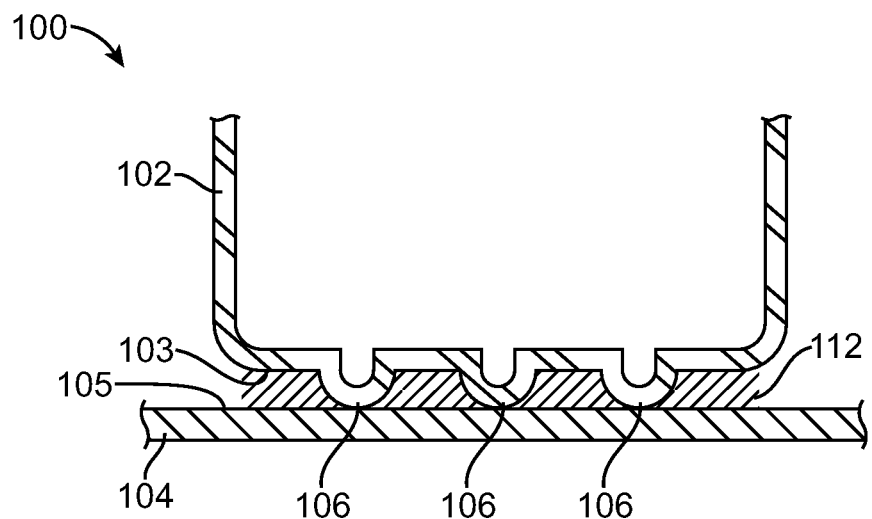
FIG. 1 depicts a cross-sectional side view of two adhered parts offset by a triad of spacer gap bumps.

In one embodiment, FIG. 1 shows device 100 having two adjacent parts 102 and 104. Three bumps 106 are disposed on the surface 103 of part 102. The bumps 106 are part gap spacers. The substantially evenly spaced bumps 106 have a substantially uniform height with respect to the surfaces 103 and 105, corresponding to parts 102 and 104, respectively. The bumps thereby provided a substantially uniform stand-off distance between parts 102 and 104.

As will be apparent to those of skill in the art, bumps may be disposed on the surfaces of either or both adjacent parts. The bumps protrude a substantially uniform distance from the surfaces of each part. The offset distance between the parts is thereby a substantially uniform distance.

When adhesive 112 is disposed between the surfaces of the adjacent parts, the bumps 106 define a substantially uniform distance between the parts 102 and 104, as well as an adhesive bond line thickness. As adhesive 112 hardens, the substantially uniform distance between parts 102 and 104 is maintained. Any adhesive known in the art may be used, including, but not limited to epoxy, two-part epoxy, ultraviolet (UV) cured epoxy, heat cure epoxy, pressure sensitive adhesive (PSA), and anaerobic adhesive.

Those of skill in the art will recognize that in other embodiments, any number of bumps may be arranged in any orientation or pattern on the surfaces. The bumps can be oriented at random, or in a specific pattern (e.g., a grid or ring). When the part gap spacers are bumps, a minimum of three bumps are necessary to provide a substantially uniform part gap distance.

The bump can be designed to provide a specific distance setting between parts. For example, the bump can be optimized for a specific adhesive according to the adhesive manufacturer's recommendations. Alternatively, one of ordinary skill in the art could optimize the distance bump height by experimenting with different bump sizes to determine which gap distance is optimal for a specific adhesive.

The bumps can be disposed on the surfaces of each part to optimize a substantially uniform stand-off distance between parts for a specific adhesive. In an exemplary embodiment, the adhesive is an epoxy. Under certain circumstances, the gap distance for setting is greater than or equal to about 50 microns, greater than or equal to about 60 microns, greater than or equal to about 70 microns, greater than or equal to about 80 microns, greater than or equal to about 90 microns, or greater than or equal to about 100 microns. For example, under the same or different circumstances, the gap distance for setting is less than or equal to about 150 microns, less than or equal to about 140 microns, less than or equal to about 130 microns, less than or equal to about 120 microns, less than or equal to about 110 microns, or less than or equal to about 100 microns. In certain circumstances, the gap distance for setting is about 100 microns. The bumps can be designed to define a distance between adjacent surfaces. It will be recognized that the gap distance can be adjusted to optimize the stand-off distance for any adhesive.

Those of skill in the art will also recognize that the bumps can be arranged at locations where adhesive is desired. The bumps create a capillary force that attracts adhesive. Adhesive thereby collects around the bumps. The bumps can thus be placed to influence distribution of adhesive along the bond line. Bond strength can be optimized to specific loading requirements of a specific application. For example a circular bond area under bending moment loading would benefit from bumps to ensure adhesive coverage near the circle perimeter where stress is highest. Adhesive is attracted to the bump by capillary action, and is thus distributed along the bond line. The effect can be cumulative when multiple bumps are placed along the bond line.

The bumps can be configured to provide a substantially uniform stand-off distance between parts in applications where a fluid, such as a bearing fluid, flows between the parts. For example, tolerances between attached parts in a hard disk drive assembly or FDB motor can be optimized for specific bearing fluids. The stand-off distance may also be set such that bearing fluid is not restricted and that there is substantially no pressure drop between the entry and exit points of bearing fluid. The standoff distance can be optimized for a specific bearing fluid. The offset distance in this case is a function of the cross-sectional area of the flow and rate at which the bearing fluid flows.

In certain embodiments, the bumps are conductive, thereby providing an electrical connection between the adjacent parts. The conductive material can be any conductive material known in the art. Conductive materials include, but are not limited to, any metal or conductive plastic. An adhesive placed between the parts can be conductive or non-conductive. Likewise, a liquid bearing fluid placed between parts can be conductive or non-conductive.

In other embodiments, the bumps are constructed from an insulating material, thereby preventing an electrical connection between the adjacent parts. The insulating material can be any insulating material known in the art. Insulating materials include, but are not limited to, any non-conductive plastic. In such embodiments, an adhesive placed between parts is generally non-conductive. Likewise, a liquid bearing fluid placed between parts is generally non-conductive.

The following describes several additional embodiments. Persons skilled in the art will understand that the same principles and variations set forth above apply to each of these other embodiments. Those of skill in the art will recognize that the various embodiments can be used alone or in combination.

Figure 2:
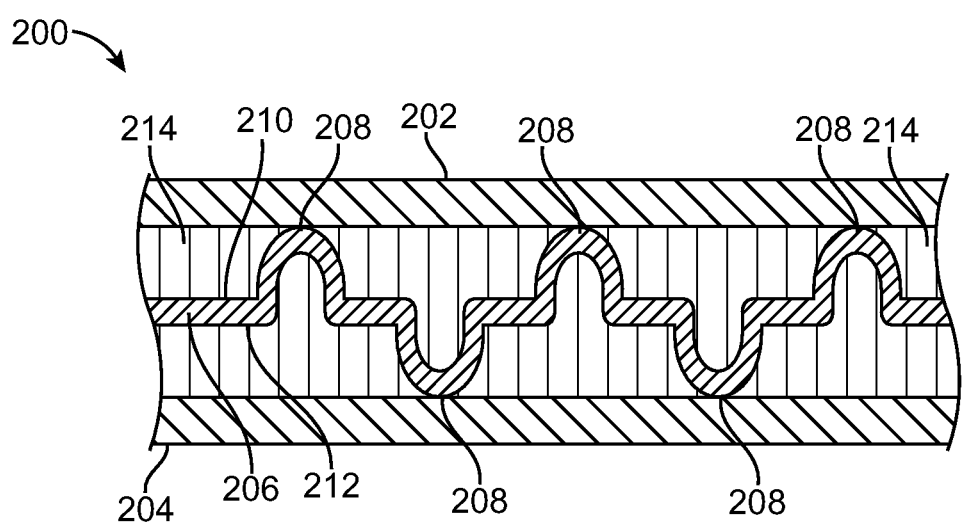
FIG. 2 depicts a cross-sectional side view two adhered parts offset by an intermediate part with bumps disposed on each side.

In another exemplary embodiment, FIG. 2 depicts device 200 having intermediate part 206 interposed between first part 202 and second part 204. A series of bumps 208 are disposed on opposite sides of intermediate part 206. Bumps 208 are part gap spacers. The intermediate part 206 sets tolerances on facing surfaces of first and second parts 202 and 204.

Intermediate part 206 sets the axial height and adhesive bond line thickness with respect to the first and second parts 202 and 204. The bumps 208 on a first side 210 of intermediate part 206 define a substantially uniform off-set distance with a first part 202, and the bumps 208 on the second side 212 of intermediate part 206 define a substantially uniform offset distance with respect to second part 204. Adhesive 214 can be placed between one or both of the first and second parts 202 and 204 and the intermediate part 206. Further, only intermediate part 206 includes bumps 208. In the embodiment of FIG. 2, only the intermediate part includes part gap spacers.

Those of skill in the art will recognize that the bumps can be configured such that bearing fluid flows readily between the intermediate part and each surface of the first part and the second part. The stand-off distance may also be set such that bearing fluid is not restricted and that there is substantially no pressure drop between the entry and exit points of bearing fluid. The standoff distance can be optimized for a specific bearing fluid, as well as other factors known to those skilled in the art of FDB design.

Those of skill in the art will also recognize that bumps can be disposed on the intermediate part in any arrangement. For example, an intermediary part having two evenly spaced planes defining outwardly facing bumps on each side acts as a part gap spacer between the surfaces of the two adjacent parts and the intermediary part. Part gap spacer allows for reduced tolerance accumulation when using adhesive to bond the parts. The bumps are configured to provide a substantially uniform stand-off distance between the adjacent parts. The stand-off distance can be optimized for a variety of factors, including the distance desired between the two attached parts and the highest strength thickness of the adhesive used between the attached parts.

In certain embodiments, the intermediate part is conductive, thereby providing an electrical connection between the first and second parts. The conductive material can be any conductive material known in the art. The material can be, but is not limited to, any conductive metal or conductive plastic. An adhesive placed between a part and the intermediate part can be a conductive adhesive or a non-conductive adhesive. Likewise, a liquid bearing fluid placed between a part and the intermediate part can be a conductive bearing fluid or a non-conductive bearing fluid. Alternatively, the intermediate part can be an insulator.

Those of skill in the art will recognize that in other embodiments, any number of bumps may be arranged in any orientation or pattern on the surfaces. The bumps can be oriented at random, or in a specific pattern (e.g., a grid or ring). The optimal amount of contact area between the part gap spacer and the contacted surface can vary, and can depend, for example, on the adhesive or bearing fluid used.

Figure 3A:
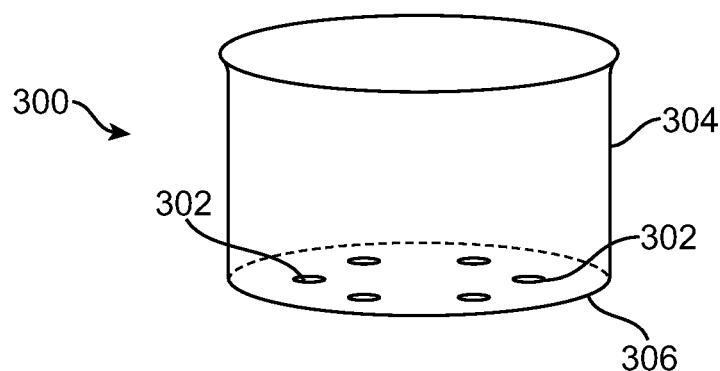
FIG. 3A depicts a perspective view of a cup having a series of bumps disposed on the upper and lower side of the bottom surface.
Figure 3B:
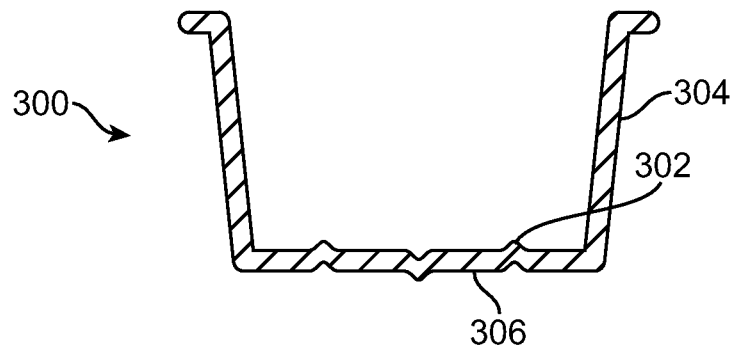
FIG. 3B depicts a cross-sectional side view of the cup of FIG. 3A.
Figure 3C:
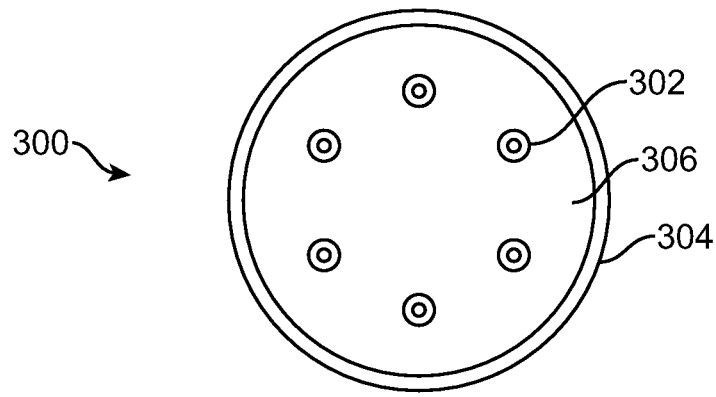
FIG. 3C depicts a top view of the cup of FIG. 3A.

In another exemplary embodiment, FIGS. 3A-C depict a cup 300 having bumps 302 disposed on its top and bottom. With reference to FIG. 3A, cup 300 has sides 304 and bottom 306. With reference to FIG. 3B, the bottom 306 of cup 300 has six radially distributed bumps 302 disposed thereon. In the present embodiment, three bumps face up, and three bumps face down in alternating fashion. With reference to FIG. 3C, the bottom 306 of cup 300 has bumps arranged on both its upper and lower surfaces.

Figure 4:
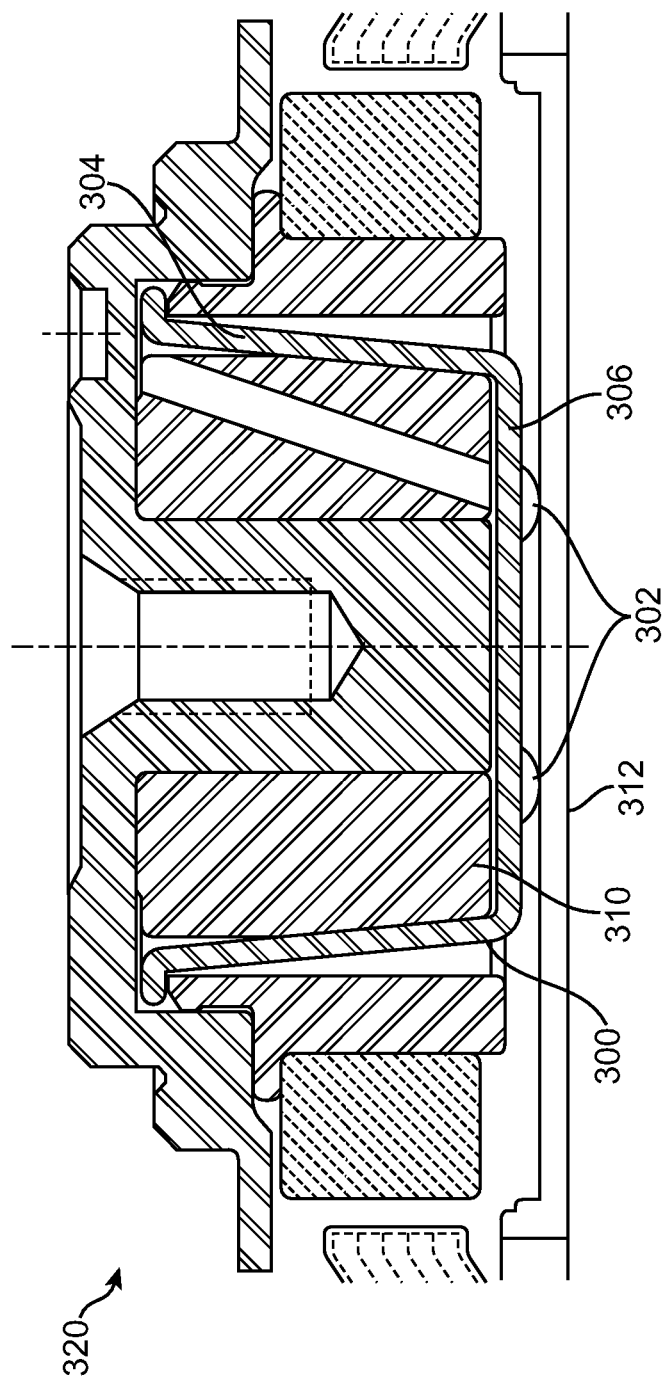
FIG. 4 depicts a cross-sectional side view of a fluid dynamic bearing motor incorporating the cup of FIG. 3.

FIG. 4 shows an embodiment of an FDB motor 320 configured with a cup 300 of FIG. 3 disposed between motor sleeve and a motor base. The bumps disposed on each side of the cup 300 provide a substantially uniform stand-off distance between cup 300 and both the motor base 312 and the motor sleeve 310. Adhesive is disposed between the motor base 312 and the bottom 306 of cup 300, thereby adhering motor base 312 to the cup 300 at a substantially uniform distance. The substantially uniform standoff between the cup 300 and motor base 312 provides substantially uniform precision spacing. The substantially uniform standoff between cup 300 and sleeve 310 provides precision spacing for the flow of bearing fluid between sleeve 310 and cup 300.

While the preceding embodiments disclose bumps as part gap spacers, those of skill in the art will recognize that bumps are but one example of a part gap spacer. Other part gap spacers include, without limitation, radial ribs, flange edges, and tapers. Persons skilled in the art will understand that the same principles and variations set forth above apply to each of these other embodiments.

FIGS. 5A and 5B show another embodiment of the present application. With reference to FIG. 5A, part 400 has a series of radial ribs 402 disposed on part surface 401. With reference to FIG. 5B, ribs 402 are part gap spacers. Specifically, the ribs have a substantially uniform height with respect to the part surface 401. When device 400 is placed against an adjacent part (not shown), ribs 402 provide a substantially uniform stand-off distance between part surface 401 and the adjacent part.

As will be apparent to those of skill in the art, ribs may be disposed on the surfaces of either or both adjacent parts. In such embodiments, the ribs protrude a substantially uniform distance from the surfaces of each part. The offset distance between the parts is a substantially uniform distance. Although ribs 402 of the present embodiment are disposed radially around part surface 401, in other embodiments ribs can be disposed in any direction on a part surface. Any number of ribs may be arranged in any orientation or pattern on the surfaces. The ribs can be oriented at random, or in a specific pattern.

As discussed with respect to the embodiments of FIGS. 1-4, adhesive can be disposed between part 400 and a contact surface of an adjacent part (not shown). Any adhesive known in the art can be used, and the ribs can be configured to optimize gap distances. The ribs can be configured to provide a substantially uniform stand-off distance between parts in applications where a fluid, such as a bearing fluid, flows between the parts.

FIGS. 6A and 6B show another embodiment of the present application. Part 500 has an edge 502 that is a part gap spacer. Specifically, edge 502 has a substantially uniform height with respect to the surface 501. When part 500 is placed against an adjacent part (not shown), edge 502 provides a substantially uniform stand-off distance between surface 501 and the adjacent part.

As discussed with respect to the embodiments of FIGS. 1-5, adhesive can be disposed between surface 501 and a contact surface of an adjacent part (not shown). Any adhesive known in the art can be used, and the flange edge can be configured to optimize gap distances. The flange edge can be configured to provide a substantially uniform stand-off distance between parts in applications where a fluid, such as a bearing fluid, flows between the parts.

Figure 7A:
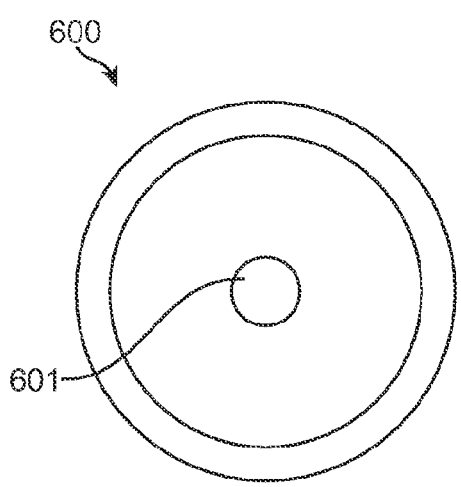
FIG. 7A depicts the top view of a tapered part.
Figure 7B:
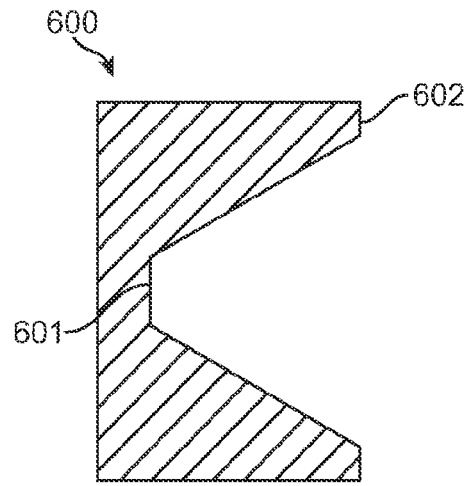
FIG. 7B depicts a cross-sectional side view of the part of FIG. 7A.
Figure 7C:
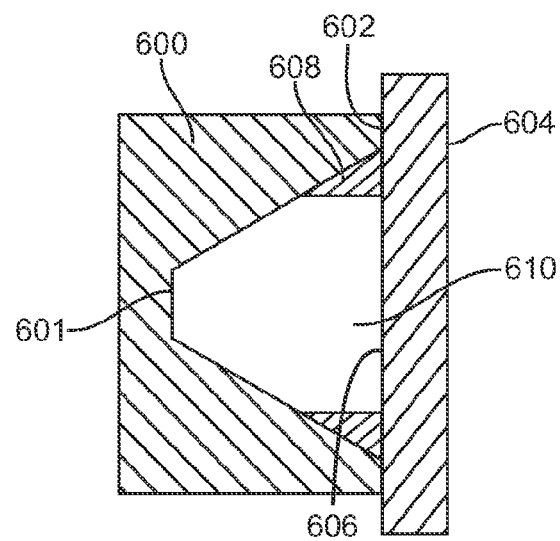
FIG. 7C depicts a cross-sectional side view of the part of FIG. 7A adhered to an adjacent part.

FIGS. 7A-C shows another embodiment of the present application. With respect to FIGS. 7A and 7B, tapered part 600 has tapers toward the center 601 of part 600. The outer diameter of the taper forms taper edge 602 that is a part gap spacer. Specifically, the taper has a substantially uniform height with respect to the center 601 of part 600.

With respect to FIG. 7C, when part 600 is placed against adjacent part 604, the taper provides a substantially uniform stand-off distance between taper edge 602 and adjacent part 604. Adhesive 608 can be disposed between tapered part 600 and a surface 606 of adjacent part 604. Capillary forces pull the adhesive toward the outer diameter of tapered part 600 to where taper edge 602 is located. Center area 610 can accommodate excess adhesive. As discussed with respect to the embodiments of FIGS. 1-4, any adhesive known in the art can be used, and the taper can be configured to optimize gap distances.

As will be apparent to those of skill in the art, two adjacent parts may be tapered. In such embodiments, the offset distance between the parts is a substantially uniform distance. Although the tapers of the present embodiment are disposed at the edge of part 600, the tapered edge at any point on part surface 600.

It will be recognized that part gap spacers such as ribs, flange edges, and tapered parts can be disposed on an intermediate part that can be disposed between adjoining parts in a manner similar to the embodiments of FIGS. 1-4.

In certain embodiments, gap spacers disposed on the part surface or intermediate part surface may be designed with a specific shape. For example, the gap spacers may be designed such that the adhesive must flow to a specific location between two surfaces. When an adhesive is applied, it flows to the narrowest space between attached parts. An array of gap spacers can be shaped such that the adhesive flows to a desired location.

It will be recognized that gap spacers can be disposed on a part parallel to the axial direction as well as a part parallel to the radial direction.

It will also be recognized that gap spacers can be designed according to any method known in the art. For example, in one embodiment the gap spacers can be stamped into one or more surfaces of the adjacent parts, or on one or more sides of the intermediate part. In other embodiments, gap spacers can be designed by precision molding. Generally speaking, any method of preparing parts can be used.

Although the foregoing has been described in some detail by way of illustration and example for purposes of clarity of understanding, it is readily apparent to those of ordinary skill in the art in light of the teachings of the present application that certain changes and modifications may be made thereto without departing from the spirit and scope of the claims. Applicants have not abandoned or dedicated to the public any unclaimed subject matter.

We claim:

1. A method comprising:

forming a plurality of spacing elements on a first surface of a first part, wherein the first part is cup shaped and the plurality of spacing elements are formed in a selected pattern and have a selected height from the first surface of the first part;

disposing a second part substantially opposite the first part, wherein at least some of the spacing elements contact the second part, thereby defining a plurality of voids;

disposing adhesive in at least some of the plurality of voids, thereby adhering the first part to the second part;

forming bumps to protrude from a second surface of the first part, wherein the second surface is substantially parallel to the first surface; and disposing a sleeve on the bumps, wherein the bumps provide a substantially uniform stand-off distance between the first part and the sleeve.

2. The method of claim 1, further comprising selecting the spacing element pattern to provide formation of spacing elements at points where higher loads are expected.

3. The method of claim 1, wherein the first or second surface of the first part is radially shaped, and further comprising selecting a radial spacing element pattern for formation at an outer periphery of the first or second surface of the first part, for resisting bending loads.

4. The method of claim 1, further comprising selecting the height of the spacing elements based on properties of the adhesive.

5. The method of claim 1, further comprising selecting an amount of contact area between the spacing elements and the first surface of the second part.

6. The method of claim 1, further comprising selecting the height of the spacing elements to provide a stand-off distance less than or equal to about 150 microns.

7. The method of claim 1, wherein the second surface of the first part is a bottom surface of the cup shape and the plurality of spacing elements comprise bumps formed to protrude therefrom.

8. The method of claim 7, wherein the second part comprises a base to a disc drive motor, and further comprising disposing a bearing fluid in a void established between the top surface of the cup shape and the sleeve.

* * * * *